United States Patent

[11] 3,574,317

| [72] | Inventor | Howell K. Brewer<br>Fairborn, Ohio (333 N. Longview St., Dayton, Ohio 45432) |
|---|---|---|
| [21] | Appl. No. | 817,502 |
| [22] | Filed | Apr. 18, 1969 |
| [45] | Patented | Apr. 13, 1971 |

[54] PUNCTUREPROOF PNEUMATIC TIRE
6 Claims, 4 Drawing Figs.

| [52] | U.S. Cl. | 152/313 |
|---|---|---|
| [51] | Int. Cl. | B60c 17/00 |
| [50] | Field of Search | 152/312, 313, 339, 340 |

[56] References Cited

UNITED STATES PATENTS

| 2,070,066 | 2/1937 | Picardi | 152/340X |
|---|---|---|---|
| 2,213,028 | 8/1940 | Kraft | 152/339X |
| 3,064,704 | 11/1962 | Richard | 152/339 |
| 3,195,601 | 7/1965 | Travers | 152/313 |

FOREIGN PATENTS

| 1,155,766 | 12/1957 | France | 152/313 |
|---|---|---|---|

*Primary Examiner*—Arthur L. LaPoint
*Assistant Examiner*—Robert Saifer
*Attorneys*—Harry A. Herbert, Jr. and Arthur R. Parker ABSTRACT: A punctureproof tubeless, or tube-type pneumatic tire equipped with a series of resilient sacs inflated with gas under pressure, and consisting of individually sealed sac elements fabricated with thin elastic or plastic sheet material conformable with the inner casing and/or tube structure. This sac element arrangement is placed in the usual main compressed gas space of the tire casing, or inner tube and automatically resists any deformation of the casing resulting from a puncture thereof.

PATENTED APR 13 1971 3,574,317

INVENTOR.
HOWELL K. BREWER
BY Harry A. Herbert Jr
ATTORNEY
Arthur R. Parker
AGENT

PUNCTUREPROOF PNEUMATIC TIRE

BACKGROUND OF THE INVENTION

The present invention relates generally to the field of technology of punctureproof pneumatic tires and, in particular, to an improved auxiliary means incorporated within, and automatically resisting deflection of the tire casing resulting from its puncture particularly during emergency situations.

In the use of aircraft under combat conditions, battle damage has occurred to the aircraft pneumatic tires as a result of the puncture thereof, for example, by bullets or shrapnel. Damage inflicted in this manner has resulted in a requirement for some relatively simple method of equipping more or less standard types of pneumatic tires, either of the tubeless or tube type, with an auxiliary system that would enable the continued use of the tire for at least a temporary period after the puncture of the main tire casing. The present invention was developed therefore to provide a battle-damaged aircraft pneumatic tire with the increased capability of further operation after its puncture for at least one additional takeoff and subsequent landing. This is accomplished by the use of a novel mechanism that is positioned to automatically act to thereby resist deflection of the tire casing after the latter has been punctured, in a unique manner to be summarized and described hereinafter in detail.

SUMMARY OF THE INVENTION

The present invention consists briefly in placing inside the usual pneumatic aircraft tire a novel system of small, sealed sacs containing gas under pressure, and collectively arranged within an elastic or plastic structure. The latter is made into a shape that conforms, or substantially conforms, with the inside surface of the tire or tube. This elastic or plastic structure may be further positioned within the main air space of a tubeless tire, or within the tube itself of a tube-type tire. With either arrangement, the tire, or tube is inflated by the usual main supply of air under appropriate pressure, which acts as the principle inflation means for the tire in the normal manner. However, in the event of a puncture, the main compressed air supply escapes from the main tire casing, and/or inner tube and, in either case, the aforementioned system of gas sacs thereafter acts as an auxiliary inflation means to thereby support the tire structure in a partly inflated condition for a limited period of operation.

Other advantages, as well as objects of the invention, will become apparent from the following detailed description of the invention, taken in connection with the accompanying drawings, in which:

DESCRIPTION OF THE PREFERRED EMBODIMENT

Figure 1:
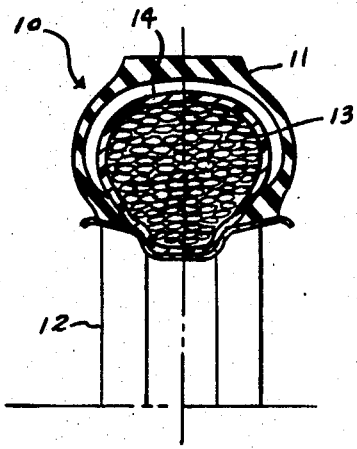
FIG. 1 represents a partly cross-sectional and schematic view of the present invention shown applied to a tubeless tire casing portion that is illustrated mounted on one-half of an aircraft wheel.

With reference to the drawings and, in particular, to FIG. 1 thereof, the present invention is shown specifically applied to a tubeless tire indicated generally at the reference numeral 10. The latter includes a portion of the tire casing at 11, which is shown applied to one-half of the wheel rim 12. Within the said tire casing 11 is placed the gas sac structure of the instant invention, which structure is indicated generally at 13. This structure may be made of an elastic or plastic material and fabricated in a mass or cluster form that is easily shaped to the configuration of the inside circumference of the tire casing 11. Moreover, said gas sac structure 13 may be further confined within, or exteriorly restricted on its outside surfaces by the reinforcing membranelike element at 14, which element 14 may also be comprised either of some type of elastic, or plastic, material as desired, and which may still further ensure that the exterior shape of the said elastic or plastic gas sac structure 13 is shaped to the approximate inside configuration of the tire casing, or inner tube, as indicated hereinbefore. Said element 14 is still further utilized to keep the gas sacs of the said structure 13 compressed against one another to thereby form a more effective auxiliary inflation means.

Figure 2:
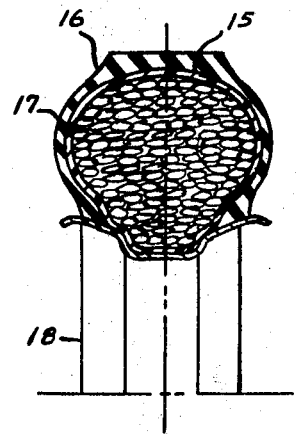
FIG. 2 is a second partly cross-sectional and schematic view, similar to that of FIG. 1, but illustrating the invention applied to a tube-type tire.

In the view of FIG. 2, the invention is shown applied to a tube-type tire with the inner tube illustrated at the reference numeral 15 being indicated in its inflated or compressed condition between the inside surface of the tire casing portion at 16, and the gas sac structure indicated generally at 17. In this manner, the said inner tube 15 acts as the restricting means for the said gas sac arrangement 17 in a manner similar to the action of the restricting membranelike element 14 used with the tubeless tire form of the invention shown in FIG. 1. The above-described tire casing portion 16 is further shown mounted on a one-half aircraft wheel rim, indicated at 18, which is similar to the previously noted wheel rim 12 of FIG. 1. Further details of the said gas sac structure 13 or 17 will be described hereinafter with specific regard to FIGS. 3 and 4.

Figure 3:
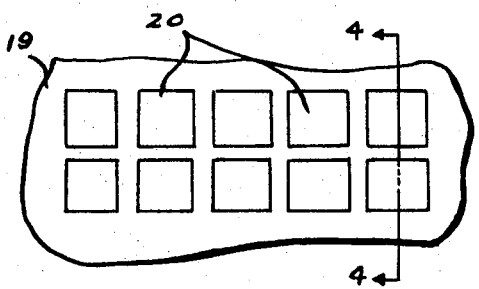
FIG. 3 is a top fragmentary view of the gas sac structure per se of the present invention, showing one arrangement of the individual gas sacs and the elastic or plastic material backing structure therefor.
Figure 4:
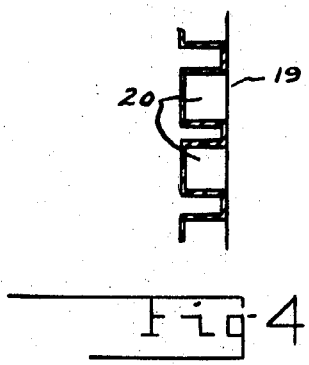
FIG. 4 represents a cross-sectional view, partly broken away and taken about on line 4-4 of FIG. 3, illustrating additional details of the inventive gas sac arrangement and the backing structure thereof.

Referring specifically to the above-mentioned FIGS. 3 and 4, it is clearly seen that the gas sac structure 13 or 17 consists basically of a thin elastic or plastic backing material, shown in sheet form at 19 (Note particularly FIG. 4). Fabricated to the said sheet material 19 are the plurality of gas sac elements at 20. The key feature of the latter elements is that they are individually sealed to the backing sheet 19 so that a puncture of the main tire casing 11, 16 (FIGS. 1 and 2) of a sufficient depth will result in the penetration and therefore the destruction of only a relatively small number of the sealed gas sac elements 20; accordingly, in the event of such damage, the majority of the said sac elements will remain in their sealed condition to thereby leave the tire still capable of operating. Although the said gas sac elements 20 are shown in the embodiment of FIG. 3 as being of a square configuration, it is to be understood that they may be made into any suitable configuration without departing from the true spirit or scope of the invention. Also, as noted hereinbefore, the elastic or plastic material comprising the gas sac structure 13, or 17, may be fabricated into a mass or cluster configuration of a size and shape appropriate to the available space within the tire casing and restricting element 14, 15.

With the improved auxiliary inflation means provided by the new and novel gas sac arrangement 13, 17 of the present invention, any damage tending to cause deflation of the tire casing 11, 16 and/or inner tube 15 is automatically compensated for to a considerable degree. Thus, when either tire and/or tube experiences structural failure, or is pierced or penetrated by projectiles, for example, the main supply of pressurized gas enclosed therewithin is naturally released and the tire begins to sink or deflect. This deflection continues only until the inner structure of the previously described individual gas sacs 20 is compressed between the tire casing 11, 16, and the wheel rim 12, 18. At this point, further deflation of the tire casing 11 or 16 is prevented by the cumulative auxiliary inflation effect collectively resulting from the plurality of gas sacs 20 when in their compressed condition. Accordingly, the said tire casing remains in a substantially inflated condition and is thereafter capable of further operation under its normal load, at least for a limited period.

Thus, a new and improved automatically operating auxiliary inflation means has been developed by the present invention for an aircraft, whereby the aircraft tire, after being punctured or pierced particularly under battle conditions, continues to be effective in properly supporting the aircraft and its load for at least temporary periods. Moreover, although the present device has been specifically described with reference to an aircraft, its application is not limited thereto, and the inventive system is considered generally applicable to pneumatic tires used with various other types of vehicles.

I claim:

1. In a vehicular-borne wheel member; a main wheel rim; a tire casing supported on said wheel rim and adapted to be normally inflated by a first, main compressed-gas inflation means; and second, auxiliary inflation means adapted to support said tire casing in a partially inflated condition on release of the compressed gas in said main gas inflation means by the puncture of said tire casing; said auxiliary inflation means being positioned within the main inflation means and comprising a plurality of individual sealed compressed-gas means automatically operative to provide substantial inflation support for said tire casing and any loads carried thereby; a relatively thin, flexible backing support means for integrally mounting thereon the interior surfaces of each of said plurality of individual sealed compressed gas means in relatively closely spaced, but separated relation relative to each other; and separate, deformable restricting means positioned in contacting relation to, and partially enclosing the exterior surfaces of said sealed compressed gas means to thereby provide reinforcement to, and substantially deform and thus compress the said exterior surfaces of said auxiliary inflation means to a relatively tightly packed configuration substantially conforming with that of the inside surface of said tire casing; said restricting means being disposed in intermediate relation to, and thereby retaining said auxiliary inflation means in spaced relation from, said tire casing to thus provide collective inflation support therefor only in the event of a puncture of the tire casing and/or tube.

2. In a vehicular-borne wheel member as in claim 1, wherein said plurality of individual sealed compressed gas means further comprises a plurality of relatively small and thin sacs containing gas under pressure and collectively operative, through the confining and compressing action of said deformable restricting means, to act outwardly against and resist the inwardly deflecting tire casing after the puncture thereof; and wherein said deformable restricting means comprises the inner surface of the tire casing.

3. In a vehicular-borne wheel member as in claim 1, wherein said separate deformable restricting means comprises a resilient restraining member mounted within, and interposed between, said tire casing and said plurality of sealed compressed gas means, and further acting against and thereby normally compressing said plurality of sealed compressed gas means in substantial contacting relation with each other to thus form a collective and thereby a more effective auxiliary inflation means.

4. In a vehicular-borne wheel member as in claim 3, wherein said resilient restraining member comprises the inner tube of a tube-type tire.

5. In a vehicular-borne wheel member as in claim 1, wherein the compressed gas inflation means of said second, auxiliary inflation means comprises a plurality of individually sealed gas sacs arranged together in a cluster configuration; and said deformable restricting means comprises a separate restraining and reinforcing membranelike member of plastic material enclosing said sealed gas sacs and positioned with said first, main compressed gas inflation means in spaced relation with, and configured to conform with, the inside surface of said tire casing to thereby force said plurality of individually sealed sacs into a relatively tight and compressed configuration.

6. In a vehicular-borne wheel member as in claim 5, wherein said backing support means comprises a thin elastic or plastic sheet material-supporting surface element adapted to be shaped to substantially conform with the inside surface of said tire casing and being further retained in spaced relation therefrom by said restraining membranelike member.